United States Patent [19]

Wengrovius et al.

[11] Patent Number: 5,106,934
[45] Date of Patent: Apr. 21, 1992

[54] HEAT CURABLE SILICONE COMPOSITIONS

[75] Inventors: Jeffrey H. Wengrovius, Scotia; Virginia M. Van Valkenburgh, Albany, both of N.Y.

[73] Assignee: General Electric Company, Schenectady, N.Y.

[21] Appl. No.: 518,344

[22] Filed: May 3, 1990

[51] Int. Cl.$^5$ ............................................. C08G 77/06
[52] U.S. Cl. ...................................... 528/15; 528/32; 528/37
[58] Field of Search ........................... 528/15, 32, 37

[56] References Cited

U.S. PATENT DOCUMENTS

| | | | |
|---|---|---|---|
| 4,257,936 | 3/1981 | Matsumoto et al. | 528/15 |
| 4,311,739 | 1/1982 | Hardman et al. | 528/32 |
| 4,618,666 | 10/1986 | Porte | 528/33 |
| 4,736,048 | 4/1988 | Brown et al. | 528/37 |
| 4,975,510 | 12/1990 | Wegehaupt et al. | 528/37 |

OTHER PUBLICATIONS

Makoto Kumada et al., Synthesis of Some Methyldisilanes Containing Functional Groups, J. Org. Chem. 1956, pp. 1264–1268, vol. 21.
Makoto Kumada et al., Preparation of Some Linear, Cyclic, or Cagelike Methylsilicon Telomers Having a Framework of —SiSiO— Chemical Abstract, vol. 59.

*Primary Examiner*—John C. Bleutge
*Assistant Examiner*—Karen A. Hellender
*Attorney, Agent, or Firm*—William A. Teoli; James C. Davis, Jr.; Paul R. Webb, II

[57] ABSTRACT

Heat curable silicone compositions are provided. Some of the heat curable silicone compositions are convertible to silicone elastomers having a high tear strength resulting from the employment of polydiorganosiloxane gum having condensed organoalkenylsiloxy units, which is used in combination with an organosilicon material having tetraorganodisilanoxy groups and a Group VIII metal catalyst, such as platinum in elemental or chemically combined form.

5 Claims, No Drawings

HEAT CURABLE SILICONE COMPOSITIONS

CROSS REFERENCE TO RELATED APPLICATION

Reference is made to copending application, Ser. No. 07/433,814, filed Nov. 9, 1989, for Silicone Copolymers Having Tetraorganodisilyloxy Groups and Intermediates Thereof.

The present invention relates to heat curable silicone compositions, such as silicone rubber. More particularly, the present invention relates to the employment of a polydiorganosiloxane gum having alkenyl radicals attached to silicon, which is used in combination with an effective amount of a Group VIII metal catalyst, such as a platinum, rhodium, ruthenium or palladium catalyst and a minor amount of an organosilicon material containing chemically combined tetraorganodisilanoxy groups of the formula,

where R is a member selected from the class consisting of the same or different monovalent $C_{(1-14)}$ hydrocarbon radicals and $C_{(1-14)}$ hydrocarbon radicals substituted with monovalent radicals inert during equilibration or condensation.

Prior to the present invention, a silicone cyclic having the formula,

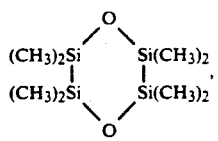

referred to hereinafter as "D'$_2$" was reported by Kumada et al, *Journal of Organic Chemistry*, 21, (1956), pp. 1264–68. Some linear, cyclic or methylsilicon telomers having a framework of

are also reported by Kumada et al, *Aogyo Kagaku Zasshi*, 66 (5), 1963, pp. 637–41. As shown by Porte, U.S. Pat. No. 4,618,666, methylsilicon resins having disilanoxy groups can be made by directly hydrolyzing methylchlorosilane synthesis residue consisting essentially of tetrachloro-1,2-dimethyldisilane, trimethyl-1,1,2-trichlorodisilane, tetramethyl-1,2-dichlorodisilane and dimethyldichlorosilane. The resulting methylsilicon resins have been found useful as molding powders, and as textile and waterproofing agents used in building construction.

In copending application, Ser. No. 07/433,814, silicone copolymers are shown, such as silicone polyimides, silicone polyamides, silicone polyesters and silicone polycarbonates having condensed tetraorganodisilanoxy groups of formula (1). A variety of heat and electron beam curable silicone copolymers are provided which are silicone polyimides, silicone polyamides, silicone polyesters, and silicone polycarbonates having an $M_n$ from about 15,000 to about 30,000.

SUMMARY OF THE INVENTION

The present invention is based on the discovery that heat curable organopolysiloxane compositions are provided which can be converted to high strength elastomers, if a polydiorganosiloxane gum consisting essentially of condensed diorganosiloxy units and having chemically combined alkenyl organosiloxy units, such as vinylmethylsiloxy units are heated in the presence of an effective amount of a Group VIII transition metal catalyst, such as a platinum, rhodium or ruthenium in elemental or combined form, as defined hereinafter, and an organosilicon material having chemically combined tetraorganodisilanoxy groups of formula (1).

STATEMENT OF THE INVENTION

There is provided by the present invention, a heat curable silicone composition comprising by weight, (A) 100 parts of an organopolysiloxane having a viscosity of at least 100 centipoise at 25° C., and consisting essentially of condensed diorganosiloxy units and having from 0.05 to 20 mole %, based on the total moles of condensed diorganosiloxy units of alkenylorgahosiloxy units, (B) 0.1 to 10 parts of an organosilicon material having chemically combined tetraorganodisilanoxy groups of formula (1) and, (C) an effective amount of a Group VIII metal catalyst in elemental or chemically combined form.

Radicals included within R of formula (1) are, for example, $C_{(1-8)}$ alkyl radicals such as methyl, ethyl, propyl, butyl, pentyl; alkenyl radicals such as vinyl, propenyl and cyclohexenyl; substituted alkyl radicals such as trifluoropropyl, cyanoethyl and cyanopropyl; $C_{(6-14)}$ aryl radicals such as phenyl, tolyl, xylyl, and halogenated derivatives thereof, such as nitrophenyl and chlorophenyl.

Among the various organopolysiloxanes having condensed alkenyl organosiloxane units there are included fluids and gums. Organopolysiloxane gums having a viscosity of at least 100,000 centipoise at 25° C. are preferred and are preferably made by equilibrating together organocyclopolysiloxane, such as octamethylcyclotetrasiloxane and organoalkenylcyclopolysiloxane such as tetravinyltetramethylcyclotetrasiloxane utilizing a standard equilibration catalyst for example an acid treated clay or basic catalyst, such as KOH or an alkaline silanolate. The silicone polymers can be further equilibrated with a chainstopper such as a hexaorganodisiloxane, for example hexamethyldisiloxane or 1,3 dialkenyltetraorganodisiloxane, for example 1,3 divinyltetramethyldisiloxane. Depending upon the application to which the heat curable silicone compositions are used, other diorganosiloxanes can be used in the equilibration mixture to incorporate into the silicone gums or fluids, other organosiloxane units, such as cyanoalkylsiloxy units, such as methylcyanoethylsiloxy, methylsiloxy, trifluoropropylsiloxy units, ethylphenylsiloxy units, and other organosiloxy units if desired, by standard equilibration techniques.

The silicone gums can be reinforced with reinforcing fillers, such as fumed silica, glass fibers, carbon fibers, and diatomaceous earth. There can be utilized from about 0 to 500 parts of filler per 100 parts of silicone gum by weight.

The Group VIII metal curing catalyst which can be employed in the practice of the invention, include Group VIII metal previously identified in the Background of the Invention, as well as iron, cobalt, nickel, iridium, and osmium. The Group VIII catalyst can be used at from 5 ppm to 500 ppm of catalyst, based on the total weight of the heat curable silicone composition. There can be used elemental platinum, or platinum compounds such as shown by Karstedt, U.S. Pat. Nos. 3,715,334 and 3,775,452. Additional platinum complexes are shown by Ashby, U.S. Pat. No. 3,159,601 and Lamoreaux, U.S. Pat. No. 3,220,972. In addition to platinum, there also can be used rhodium metal, or rhodium trichloride as well as ruthenium dihalides or trihalides, such as the corresponding chlorides. The Group VIII catalysts also can be used in combination with inhibitors, such as vinyl acetate, dimethyl maleate or diallyl maleate.

In order that those skilled in the art will be better able to practice the present invention, the following examples are given by way of illustration and not by way of limitation. All parts are by weight unless otherwise indicated.

EXAMPLE 1

A series of heat cured silicone rubber compositions were prepared by milling together 100 parts of a polydimethylsiloxane gum having a penetration of about 900, and containing 2.5 parts of a methoxy stopped polydimethylsiloxane process aid having a viscosity of about 10 centipoise at 25° C. and 2.5 parts of a silanol stopped polydimethylsiloxane process aid having a viscosity of about 10 centipoise at 25° C. and 0.8 part of vinyltriethoxysilane and about 63 parts of fumed silica treated with octamethylcyclotetrasiloxane, and 50 parts ppm of platinum, in the form of a vinyldisiloxane complex. The polydimethylsiloxane gum also had 0.2 mole % of condensed methylvinylsiloxy units. The aforementioned silicone rubber compositions were then blended with various parts by weight of the silicone octamethylsilanoxy cyclic ($D'_2$) of formula (2). The silicone gum was initially blended on a two-roll mill with the $D'_2$ followed by the incorporation of the platinum catalyst.

The heat curable silicone rubber compositions were heated to 400° F. in a Monsanto Rheometer 100. The durometer, a measure of hardness (inch-pound) was plotted as a function of time on a Monsanto Therm-o-logger. A maximum durometer was observed in less than 2 minutes and usually less than 1 minute. Durometer was also measured by the Shore A method. The following durometers were obtained from the various heat cured silicone rubber compositions expressed in parts of $D'_2$.

| $D'_2$ (parts) | Durometer (in-pounds) |
| --- | --- |
| 5 | 65 |
| 4 | 67 |
| 3 | 53 |
| 2 | 69 |
| 1 | 62 |
| 0.5 | 44 |
| 0.25 | 40 |
| 0 | 0 |

An uncured portion of each of the above compositions was retained at room temperature for 60 days. None of the retained samples exhibited any significant change in physical properties after the 60 days shelf period under ambient conditions.

A portion of the heat cured silicone composition containing 2 parts of $D'_2$ was further evaluated for various physical properties after being cured at 360° F. in a Wabash Compression Molder. A heat curable silicone composition also was prepared following the same procedure utilizing the same fumed silica reinforced polydimethylsiloxane gum, but substituting 1.2 parts of 2,5-dimethyl-2,5-di(t-butylperoxy)hexane (Lupersol 101, of the Pennwalt), Inc. for the platinum and $D'_2$. The respective heat cured rubbers provided the following physical properties,

|  | $D'_2$/Pt | Peroxide |
| --- | --- | --- |
| Tensile | 1261 | 1116 |
| Elongation at break (%) | 807 | 265 |
| Tear strength | 232 | 106 |
| Durometer | 51 | 71 |

The above results show that $D'_2$/Pt cured rubber has superior tensile and tear strength when compared to the peroxide cured silicone rubber.

EXAMPLE 2

A vinyl chainstopped polydimethylsiloxane fluid having a viscosity of 400 centipoise at 25° C. was prepared by equilibrating a mixture of octamethylcyclotetrasiloxane, tetramethyl- tetravinylcyclotetrasiloxane and 1,3-divinyltetramethyldisiloxane. The resulting polydimethylsiloxane fluid also had about 4 mole % of vinylmethylsiloxy units based on the total moles of condensed dimethylsiloxy units and methylvinylsiloxy units.

A disilanoxy containing hydrolysis product was obtained by hydrolyzing 20 grams of the primary chlorosilane residue obtained from a methylchlorosilane reactor in 50 ml of water cooled in an ice bath. There was added to the resulting mixture sufficient aqueous sodium hydroxide to neutralize the HCl formed during the hydrolysis. Methyl orange was used to indicate when the pH was neutral After stirring at 25° C. for 12 hours, the mixture was extracted with hexane. The hexane solution was filtered and dried over magnesium sulphate There was obtained 5 grams of a disilanoxy hydrolyzate in the form of an oil after the solvent was removed in vacuo A mixture of 50 parts of the vinyl chainstopped polydimethylsiloxane fluid, 2.5 parts of the disilanoxy containing hydrolyzate, and 50 ppm of platinum catalyst in the form of a platinum vinylsiloxane complex was heated to 400° F. for 2 minutes A cured flexible product useful as an encapsulant was obtained.

Although the above examples are directed to only a few of the very many variables which can be used in the practice of the present invention, it should be understood that the present invention is directed to a much broader variety of heat curable silicone compositions including silicone elastomers as set forth in the description preceding these examples For example, there can be used additional organosilicon materials containing disilanoxy groups of formula (1) as well as other polydiorganosiloxane gums and Group VIII curing catalyst.

What is claimed is:

1. A heat curable silicone composition comprising by weight, (a) 100 parts of an organopolysiloxane having a viscosity of at least 100 centipoise at 25° C. and consisting essentially of condensed diorganosiloxy units and 0.05 to 20 mole % of alkenylorganosiloxy units, based on the total moles of condensed diorganoxiloxy units, (b) 0.1 to 10 parts of an organosilicon material having chemically combined tetraorganodisilanoxy groups of the formula,

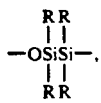

where R is a member selected from the class consisting of the same or different monovalent $C_{(1-14)}$ hydrocarbon radicals and monovalent $C_{(1-14)}$ hydrocarbon radicals substituted with radicals inert during equilibration or condensation and, (c) an effective amount of a Group VIII metal catalyst in elemental or chemically combined form.

2. A heat curable silicone rubber composition in accordance with claim 1, where the organopolysiloxane is a polydiorganosiloxane gum consisting essentially of chemically combined dimethylsiloxy units and methylvinylsiloxy units.

3. A heat curable silicone composition in accordance with claim 1, where the organosilicon material having chemically combined tetraorganodisilanoxy groups is

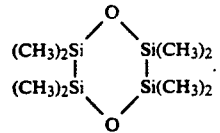

4. A heat curable composition in accordance with claim 1, where the Group VIII metal catalyst is a platinum catalyst.

5. A heat curable organopolysiloxane composition in accordance with claim 1, where the organosilicon material having chemically combined tetraorganodisilanoxy groups is a hydrolyzate from a methylchlorosilane reactor residue.

* * * * *